(12) United States Patent
Mesiano et al.

(10) Patent No.: US 11,824,971 B2
(45) Date of Patent: Nov. 21, 2023

(54) PEER-TO-PEER TRANSMISSION SYSTEM WITH A CONTROLLED, DOUBLE-TIER CRYPTOGRAPHIC KEY STRUCTURE

(71) Applicant: Swiss Reinsurance Company Ltd., Zurich (CH)

(72) Inventors: Cristian Mesiano, Adliswil (CH); Pierluigi Fasano, Morges (CH); Rene Turra, Zumikon (CH)

(73) Assignee: Swiss Reinsurance Company Ltd., Zurich (CH)

( * ) Notice: Subject to any disclaimer, the term of this patent is extended or adjusted under 35 U.S.C. 154(b) by 792 days.

(21) Appl. No.: 15/427,439

(22) Filed: Feb. 8, 2017

(65) Prior Publication Data

US 2018/0076954 A1  Mar. 15, 2018

Related U.S. Application Data

(63) Continuation of application No. PCT/EP2016/071385, filed on Sep. 10, 2016.

(51) Int. Cl.
*H04L 9/08* (2006.01)
*G06F 21/60* (2013.01)
(Continued)

(52) U.S. Cl.
CPC .......... *H04L 9/0822* (2013.01); *G06F 21/606* (2013.01); *G06Q 10/10* (2013.01);
(Continued)

(58) Field of Classification Search
CPC ... H04L 9/0822; H04L 9/0866; H04L 9/0825; H04L 63/061; H04L 9/006; H04L 9/14;
(Continued)

(56) References Cited

U.S. PATENT DOCUMENTS 5,892,900 A * 4/1999 Ginter ................ G06Q 20/12
726/26
6,226,618 B1 * 5/2001 Downs ................ H04L 67/18
705/51
(Continued)

FOREIGN PATENT DOCUMENTS

CN  107666388 B  * 11/2019 ........... G06F 21/602
GB  2386518 A  * 9/2003 ........... H04L 9/0618

OTHER PUBLICATIONS

Schneier, B. (1996). Applied cryptography. John Wiley. (Year: 1996).*

(Continued)

*Primary Examiner* — John W Hayes
*Assistant Examiner* — Dennis G Keritsis
(74) *Attorney, Agent, or Firm* — Oblon, McClelland, Maier & Neustadt, L.L.P.

(57) ABSTRACT

Aspects of the disclosure provides a secure key management and data transmission system that includes a transmission system, a data consumer network device, a user network device, and a data transmission network. The transmission management system is configured to receive user-specific data from the user network device via the data transmission network and receive a request for a service corresponding to processing the user-specific data according to a proprietary process provided by the data consumer network device. The transmission management system is also configured to generate service response data based on processing the user-specific data according to the proprietary process in response to the received request, encrypt the service response data to become single-encrypted service response data, transmit the single-encrypted service response data to the data consumer network device, and receive and store double-encrypted service response data from the user network device.

5 Claims, 7 Drawing Sheets

(51) Int. Cl.
  *G06Q 30/00*   (2023.01)
  *H04L 9/40*    (2022.01)
  *G06Q 40/08*   (2012.01)
  *G06Q 10/10*   (2023.01)
  *G06Q 20/38*   (2012.01)
  *H04L 9/00*    (2022.01)
  *H04L 9/14*    (2006.01)
  *H04L 9/30*    (2006.01)
  *H04L 9/32*    (2006.01)

(52) U.S. Cl.
  CPC ......... *G06Q 20/3829* (2013.01); *G06Q 30/00* (2013.01); *G06Q 40/08* (2013.01); *H04L 9/006* (2013.01); *H04L 9/0825* (2013.01); *H04L 9/0866* (2013.01); *H04L 9/14* (2013.01); *H04L 9/3066* (2013.01); *H04L 9/3263* (2013.01); *H04L 63/0428* (2013.01); *H04L 63/061* (2013.01); *G06F 2221/0788* (2013.01); *G06Q 2220/00* (2013.01); *H04L 9/50* (2022.05); *H04L 2209/56* (2013.01); *H04L 2209/603* (2013.01); *H04L 2463/102* (2013.01)

(58) Field of Classification Search
  CPC . H04L 9/3066; H04L 9/3263; H04L 63/0428; H04L 2209/603; H04L 2463/102; H04L 2209/38; H04L 2209/56; G06F 21/606; G06F 2221/0788; G06Q 30/00; G06Q 40/08; G06Q 10/10; G06Q 20/3829; G06Q 2220/00
  See application file for complete search history.

(56) References Cited

U.S. PATENT DOCUMENTS

| | | | |
|---|---|---|---|
| 6,539,364 B2* | 3/2003 | Moribatake | G06Q 20/02 705/1.1 |
| 6,959,288 B1 | 10/2005 | Medina et al. | |
| 9,276,737 B2 | 3/2016 | Peirce | |
| 10,395,062 B2* | 8/2019 | Uhr | H04L 63/123 |
| 2005/0251491 A1 | 11/2005 | Medina et al. | |
| 2008/0069343 A1* | 3/2008 | Greco | H04L 9/0822 380/44 |
| 2008/0172747 A1 | 7/2008 | Hurtado et al. | |
| 2013/0185214 A1* | 7/2013 | Azen | G06Q 20/206 705/76 |
| 2015/0254463 A1 | 9/2015 | Ryhorchuk et al. | |
| 2016/0078431 A1* | 3/2016 | Ramachandran | G06Q 30/0605 705/64 |

OTHER PUBLICATIONS

CN107666388B_translated by Google Translate (Year: 2023).*
International Search Report and Written Opinion dated Dec. 14, 2016 in PCT/EP2016/071385.

* cited by examiner

1 Central, peer-to-peer (P2P) transmission system
12 Access control module
121 First authentication database
122 Second authentication database
13 Encryption/Decryption-Unit
14 Network interface
15 Billing module
153 Billing gateway interface
2 Double-tier cryptographic keys
21 First cryptographic key
211 Service response data
212 Single encrypted service response data
22 Second cryptographic key
221 Double encrypted service response data
3 User network node
31 End-user
32 Network interface
33 Capturing device
331 Individual, user-specific data
4 Data consumer network node
41 Network interface
42 First data container
43 Second data container
5 Data-transmission network
6 Secure key management and data transmission system

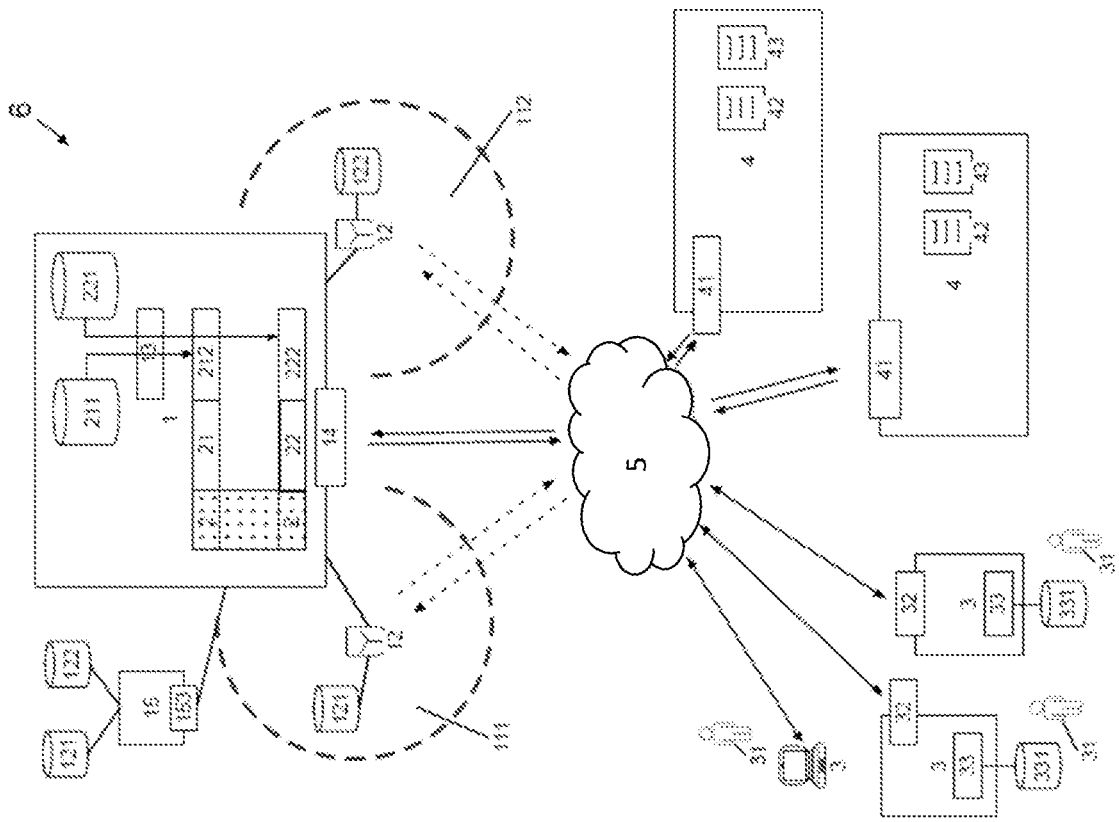

Fig. 1A

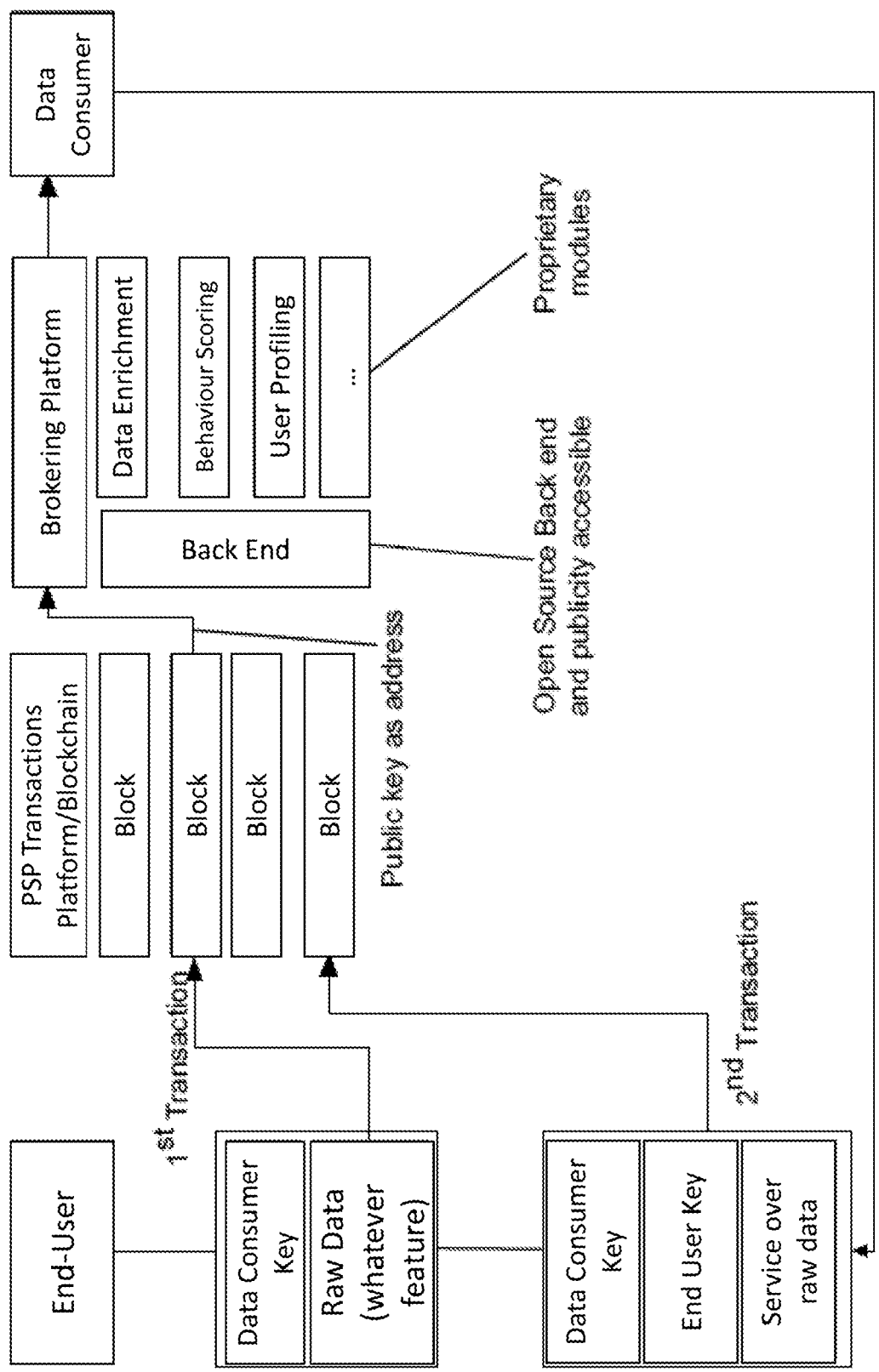

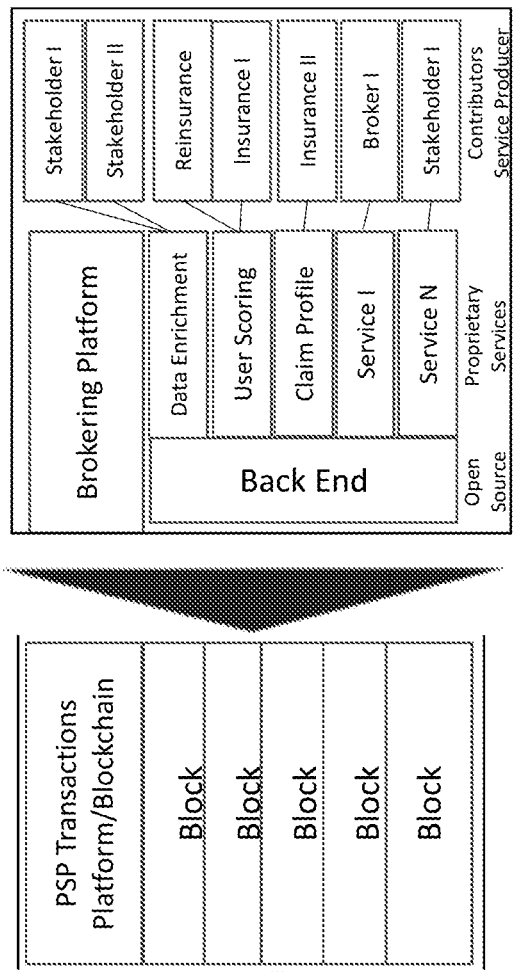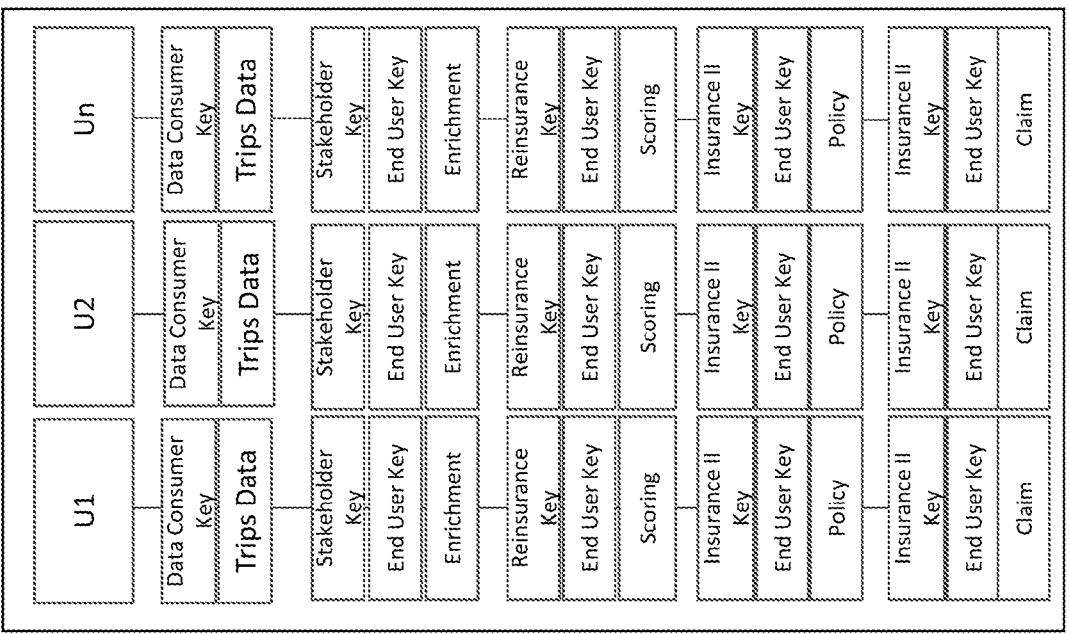
Fig. 5

PEER-TO-PEER TRANSMISSION SYSTEM WITH A CONTROLLED, DOUBLE-TIER CRYPTOGRAPHIC KEY STRUCTURE

CROSS-REFERENCE TO RELATED APPLICATIONS

This application is a continuation of International Application No. PCT/EP2016/071385 filed on Sep. 10, 2016, the entire content of which are incorporated herein by reference.

FIELD OF THE INVENTION

The present invention relates to systems for secure content sharing. More particularly, the invention relates to secure content distribution, as well as secure content sharing between various authorized units. In general, the techniques described herein generally relate to secure content sharing, which can also involve integrated content licensing. More particular, the present invention relates to systems for securely transferring digital information for data sharing, in particular in relation to automated risk-transfer underwriting systems (UW). More particular, it is a system providing secure digital sharing of individual user data, underwriting decisions, policyholder information, as well as other data needed to issue a policy, for example for underwriting decisions, exclusions, loadings, critical values, notes for claims, names, surnames, email addresses, phone numbers, addresses, ages, genders, smoker status, etc. In general, the invention discloses a system for protecting user information from unauthorized access, use, disclosure, disruption, modification, perusal, inspection, recording or destruction during the process of confidential and use-sensitive data exchange, as, for instance, used for secure insurance underwriting (UW), banking data exchanges, health data exchanges or other exchanges of highly sensitive data. The related fields also involve, in particular, the field of secured data transmission systems which are for example related to medical services, where sharing of information is regulated and/or sensitive; the field of commerce conducted on an automated basis, namely e-commerce, where a large part of online shopping involves people who want personalized services but do not want to share or distribute all their personal details; and finally related to the field of automated cross-selling platforms, in particular related to the various commercial activities focusing on the cross-selling of products to one's own customers or across to other customers.

BACKGROUND OF THE INVENTION

Automated machine-to-machine (or device-to-device) communications are becoming commonplace throughout monitoring and control applications. The broad deployment of technologies utilizing machine-to-machine communications, such as wireless sensor networks or telematics, has been coupled with an increased need to secure the communications between these devices. For example, mobile devices and smart objects, such as cellular telephones, ad hoc sensor devices, radio frequency identification (RFID) devices and/or telematics devices are essential components in the ever more ubiquitous networked information systems that underlie a multitude of interacting applications and services. Information is constantly being captured by, generated by, and moved to and from mobile devices. Thus, end-users produce a multiplicity of personal data through devices such as mobile phones, web browsers, smartboxes for telematics/health/wellness/home. This electronic information can be critical and can include sensitive personal and business information used for financial, security, health, device operations and other applications typically performed by large databases and servers. Furthermore, such data are an intangible asset. If not otherwise stipulated, the owner of the data is normally the subject that produced the data, i.e. the end-user. However, the end-user typically is not willing to share such data with 3rd parties, since it might be perceived as an intrusion in their privacy, all the more so, if end-users do not receive a pay-off for the data that is shared. Besides that, the use and dependence upon mobile devices for critical applications has made them targets of electronic, networked, and other attacks. Combined with their constant use of networked connectivity, these mobile electronic assets are vulnerable to attacks originating anywhere in the world. Consequently, mobile devices and smart objects require a similar level of secure functionality as is provided by their resource-rich server and database counterparts.

On the other side of the end-user and originator of the personal data, for example telematics data, are the service providers, for example telematics platforms etc., and/or other data consumers (for example risk transfer systems as insurance- and/or reinsurance technology systems), which need to have access to end user data to tailor customized solutions for their respective customers, or to provide the desired service to the end-user. However, data consumers cannot manage data without considering the fact that the data owner is the end-user. The objective of the data consumer is not to own the data. The target is to make sense of the end-user data to in return offer customized services and solutions. Furthermore, the data consumer doesn't need to own/store the personal data of the user. Nevertheless, the output of end-user data processing (for enrichment/processing/statistical analysis/market analysis . . . ) likewise only belongs to the end-user.

In the state of the art, appropriate security services are typically supported by or provided by a local security domain authority. One reason behind this is that mobile devices and smart objects are resource-limited. Domain authorities provide a range of security services, such as session key establishment, identity authentication, and data integrity. The security services provided by a domain authority facilitate secure communications and secure operations of mobile devices operating within its domain. This security is achieved primarily through the use of cryptography. As such, the security services rely upon cryptographic ciphers and keys, and are dependent upon the domain authority having, or accessing the cryptographic keys (public keys and/or secret keys) used by the devices within its domain. Moving or roaming mobile network nodes complicate, by their mobility, the delivery of security services, particularly as mobile devices move from one security domain to another, because of the need to securely distribute keys across security domains. Consequently, multi-domain security capabilities are critical components in the use of secured mobile devices and smart objects. The normal approach to multi-domain security services, including identity authentication, is to maintain a peer-to-peer relationship between domain authorities. The establishment and maintenance of a relationship with another domain authority may involve complex and potentially expensive operations and procedures. However, apart from mobility problems, including within a secured domain, the control of the personal data of the end-user is shifted to the security service provider, and a differentiated handling of different data is normally not possible by the end user.

Secured communications require the use of either a symmetric or asymmetric cryptographic algorithm to prevent a range of attacks on the communications, the machines and the information systems themselves. In a broad range of applications, it is often required that two machines, or devices, need to interact without prior knowledge of one another. In these cases, in the state of the art, the devices normally use a trusted third party in order to authenticate one another's identity and to establish a secure communication channel. For asymmetric ciphers, such as Elliptic Curve Cryptography (ECC) and RSA, a PKI (Public Key Infrastructure) system is commonly utilized. Such asymmetric ciphers use a public key and a private key. The public key is made available to anyone, whereas the private key is a secret key that is generally not shared with any other devices (except possibly the key generation system used by that device). For the key exchange, the PKI systems are used to generate and assign public-private keys to devices. Regardless of how keys are assigned to a device, a device authenticates itself to the PKI system, typically through some out-of-band method. By authenticating itself to the PKI system, the device receives a digital certificate signed by the PKI system that indicates that the PKI system has authenticated the device and the association of the public key with that device. The certificate is a file containing an encrypted portion, encrypted by the PKI authority's private key, which binds the device's identity to its public key. The device's certificate is stored on the device itself. In the case, where two or more devices interact for the first time, they typically will exchange certificates. Each device will then use the appropriate PKI authority's public key to authenticate the certificate, thereby authenticating the identity of the other device. Each device determines if the authority is a trusted authority for that device, typically by consulting a list of trusted authorities with their public keys that is stored on the device. Finally, if the devices trust the certificates, then they subsequently use one another's public keys for secure communication. Typically, the first secure communication, using the asymmetric cipher, is the exchange of a private key for use with a symmetric cipher with the symmetric cipher used thereafter for secure communications.

However, whereas a PKI system has been made to work for the public-private key cryptographic ciphers, it does not work with symmetric or shared-key ciphers. For symmetric ciphers, domain-specific key management and authentication systems have been developed. A well-known prior art system of this type, which may serve here as an example, is the Kerberos system developed at the Massachusetts Institute of Technology (MIT). Kerberos is a trusted third party (TIP) system that uses symmetric ciphers to authenticate the identity of machines based upon knowledge of a shared secret with the Kerberos system and to securely assign a shared secret session key to machines requesting to communicate securely with one another. Kerberos is domain specific as it operates only within a specific security domain, or network of machines (cf. RFC 1510). The Kerberos system uses a series of encrypted messages to prove to the Kerberos server that a machine is aware of a shared secret with the Kerberos server. Kerberos is used to authenticate all machines that wish to communicate (typically, Kerberos is used to authenticate two machines for pair-wise communication, i.e. one machine to another machine). After all machines are authenticated, the Kerberos server uses each machine's secret key that is shared with the Kerberos server to encrypt a message that includes a secret key to be shared with the other authenticated machines, called a session key, that is then sent to that machine. Since all authenticated machines that wish to communicate are sent the same session key, they may use that key and a symmetric key cipher to communicate securely with one another. Also, these type of systems have various limitations as regards automated machine-to-machine (or device-to-device) communications, as, for example, provided by mobile telematics devices. Typically, the differentiated, source- or kind-specific control of the personal data by the end-user and a differentiated handling of different data by the end user is not possible. Another limitation of these systems is that it is typically computer-system-domain-specific. For example, Kerberos does not work in a general public environment where devices originate from any domain. A device must be registered with a domain's Kerberos system prior to the request of the device to be authenticated while it is communicating within that domain. Furthermore, it is normal that these systems, just like Kerberos, work with symmetric key ciphers only, and they do not work with asymmetric ciphers such as ECC or RSA.

Prior art systems, addressing the mentioned deficiencies, are called Key Management Solutions or Systems (KMS). They also allow for digital rights management (DRM) systems, which refer to access control technologies used by hardware manufacturers, content providers, publishers, copyright holders or others to control use of digital content. DRM is generally used to describe any technology that inhibits use of the digital content that is not desired or intended by the content provider. In some DRM implementations, the ability to control distribution is tied to the content itself and content providers may require a unit, requesting access, for example controlled by a possible consumer, to authenticate using appropriate credentials, such as for example username and password, or other login credentials or electronic identification, authentication and/or authorization means, to gain access to the content. Usernames and passwords can be forgotten, compromised or shared, limiting the effectiveness of such DRM implementations. Alternatively or additionally, DRM implementations can be largely limited to audio and video content, to captive formats, to captive platforms, and/or with captive and cumbersome software development kits (SDKs). These factors can limit the types of content that may be distributed and/or the size of the audience that can be reached for such content or that can access the content. Also, Key management systems (KMS) typically provide for the management of cryptographic keys in a cryptosystem. This includes dealing with the generation, exchange, storage, use, and replacement of keys. It includes cryptographic protocol design, key servers, user procedures, and other relevant protocols. Key management systems handle keys at the user level, for example between users or systems. In contrast, key scheduling typically refers to the internal handling of key material within the operation of a cipher. Successful key management is critical to the security of a cryptosystem. Even if, in practice, it is arguable that this is the most difficult aspect of cryptography systems, since it involves system policy, user training, organizational and departmental interactions, and coordination between all of these elements. Furthermore, these cryptographic systems can use different types of keys. These typically include symmetric keys or asymmetric keys, as already discussed. However, these methods are usually complicated and time-consuming and not as suitable for control on a larger scale, as is the control of generally captured, user-specific telematics data in interaction with services and solution provided by third parties that are optimized and based on the user-specific data.

SUMMARY OF THE INVENTION

It is one object of the present invention to provide a system and method for providing a closed cryptosystem for secure content and data distribution within a secured network environment, which does not have the aforementioned drawbacks. In particular, it is meant to be possible to provide an apparatus and method for automated and differentiated access and billing control within a double encrypted system. More particular, it is an object of the invention to realize an automated system allowing the end-user to monetize the intangible asset represented by captured, individual and user-specific raw data. The invention should provide a technical structure allowing an end-user to safely share personal data with a data consumer agent in order to receive in return customized services. Finally, the end-user should be technically enabled to ensure that the data consumer agent will not misuse the data that is shared. On the other hand, the invention should also technically enable a data consumer to verify the raw data produced by the end-user in order to avoid (in)voluntary manipulation thereof.

According to the present invention, these objects are achieved, particularly, with the features of the independent claims. In addition, further advantageous embodiments can be derived from the dependent claims and the related descriptions.

According to the present invention, the above-mentioned objects for a secure key management, peer-to-peer transmission system based on a controlled, double-tier encrypting cryptographic key structure providing a closed cryptosystem for secure content distribution and further processing within a provided, secured network environment, wherein individual, user-specific data, are measured and/or captured and/or generated by means of at least one capturing device associated with a user network node. Furthermore, based upon the individual, user-specific data services, the above-mentioned objects are requested from and provided to the user network node by means of a data consumer network node, in which the captured individual, user-specific data are transmitted from the user network node to a central, P2P transmission system via a data transmission network and stored in the central, P2P transmission system, wherein the individual, user-specific data are processed by means of a non-storage-based processing unit associated with the central, P2P transmission system providing the service of the data consumer network node requested by the user network node, in which a first cryptographic key is generated by the non-storage-based processing unit, wherein service response data of the requested service are encrypted by means of the first cryptographic key to single encrypted service response data and transmitted to the user network node in response to the requested service, in which the received single encrypted service response data are encrypted by means of a generated second cryptographic key to double encrypted service response data by the user network node and transmitted back and stored in the central, P2P transmission system by the user network node, and in which the first cryptographic key is transmitted to or made accessible by the user network node, if predefined authorization-parameters are triggered by means of the central, P2P transmission system. The capturing device and/or the user network node can for example comprise a mobile phone and/or a web browser and/or telematics devices or a smartbox capturing health and/or wellness and/or home-related measuring parameters.

The present invention has, inter alia, the advantage that it allows the digital sharing of personal data, underwriting decisions, policyholder information as well as other data needed to issue a policy, for example underwriting decisions, exclusions, loadings, critical values, notes for claims, name, surname, email address, phone number, address, age, gender, etc. Moreover, the invention generally allows one to exchange secure information between two systems that are controlled on a step-by-step basis and for example are billed on a step-by-step basis by a dedicated third supervising system, i.e. the secure key management system. A further advantage is related to the field of secured data transmission systems related to medical services where sharing of personal health/home etc. information is regulated and otherwise sensitive. A data-sensitive example is where an end-user produces raw data (for example trip data) via telematics devices. The trip data are stored as immutable transactions ($1^{st}$ transaction) in the central, P2P transmission system. Data are encrypted with the user key. The user requests an enrichment service of the non-storage-based processing about the trip data. The service is provided by a proprietary module developed by a data consumer network node. Data are processed by the platform via a user public key (as address) directly by the central, P2P transmission system. The data consumer network node stores the output of the service in the chain of the user encrypting it via user key and SP1 public key ($2^{nd}$ transaction). The data of this transaction is owned by the end-user, but encrypted by end-user and data consumer key. To access the data both of the private keys are required. The invention allows one to combine various services. For example, the end-user may ask an additional service of the non-storage-based processing unit, for example, a scoring service. To receive it, the end-user must ask the data consumer to decrypt the data (this may happen automatically in the back end of data consumer), which is represented in the $3^{rd}$ transaction. A fee for the transaction might be charged to the end-user's network node. The user network node receives the service from another data consumer, where again the output is stored in the end-user chain and is encrypted via the public key of the end-user and the public key of data consumer. Here too, the scoring, just like all the other services are data owned by the end-user. The end-user asks for a service of the non-storage-based processing unit, which is broadcast to various different data consumer services able to cope with the request (in this case, risk-transfer data services, for example a premium quote). The non-storage-based processing unit sends the quotes back to the user network node. The end-user selects and/or chooses the preferred option and stores the selection ($4^{th}$ transaction) in the chain, encrypting it with the public key of the end-user and the public key of the data consumer network node. The $5^{th}$ transaction occurs at the time in which the end-user reports (or alternatively the device generating data detects) a crash. The same encryption as above is performed. All the transactions happen securely in the central, P2P transmission system. All the data in the chain belongs to and are controlled by the user network node. The same is true for the output of the services. Services provided by a data consumer network node K to the end-user will be encrypted with the end-user key and the data consumer network node K.

Thus, in view of applying the present inventive system 6 to the field of sensitive data handling such as risk-transfer or medical services, it has, inter alia, the advantage of providing the technical means for the sharing of non-sensitive data for faster response or processing, while securely handling the personal data. The end-user can have peace of mind when using and distributing personal information. Furthermore, the system provides an efficient and cost-effective way to share sensitive data, and finally it also provides a recordable and traceable way of getting customer consent to share data. Other advantages relate to the field of commerce conducted in an automated manner, namely e-commerce, where a large part of shopping online involves people who want personalized services but do not want to share all personal details. The present invention based on the double-tier encryption keys allows the user to share information about themselves that will allow companies to present tailored offers without needing personal details of the individual (name, address, telephone number, etc.) which are not actually relevant to the offer. Once an end-user chooses to take up the offer, they are then willing to share the rest of the information to cash in the offer. Retailers/companies can thus get better access to details from possible clients to tailor the product. Thus, related to the field of e-commerce, the present invention allows sharing of non-sensitive data for faster response or processing, while securely handling personal data. The invention allows for more tailored offers for individuals without sacrificing personal information, which is not possible by the known prior art systems. Furthermore, the invention allows for a very fast and secure way to conclude the transaction once the client wants to conclude it; it creates an efficient and cost-effective way to share sensitive data; and a recordable and traceable way of getting customer consent to share data. Finally but not lastly, in relation to the field of automated cross-selling platforms, the present invention has the following advantages, especially related to the various commercial activities focused on cross-selling products to one's own customers or across to other customers: Typically it is easier to target one's own customers with more detailed offers, however, it gets very difficult to sell other company's products in such a space or cross-sell one's own products to another company's user group. The present invention, based on the double-tier encrypted key structure, is able to open this opportunity in a unique way and maintain the user's data safe in a cheap and secure way. Only non-identifiable data (i.e. which cannot identify the individual) is shared with 3rd party service providers, which enables them to compile an offer to the individual. If the individual chooses to take up the offer, they will be notified of the information that will be shared. If they agree (i.e. by selecting certain service response data), then this cross-platform cross-company up-sell activity can be conducted in a safe, cheap and productive manner by means of the inventive system of the present invention. Therefore, related to automated cross-selling platforms, the present invention has, inter alia, the advantages of sharing non-sensitive data for faster, personalized offers from many sources, while securely handling personal data. Furthermore, the invention has the advantage of providing the technical means to allow for more tailored offers for individuals, without sacrificing personal information; a very fast and secure way to conclude the transaction once the user wants to conclude it; an efficient and cost effective way to share sensitive data; and finally a recordable and traceable way of getting user consent to share data.

In one alternative embodiment, the user network node can for example comprise a payment transfer module configured to receive and store payment transfer parameters associated with the transfer to or access to the first cryptographic key to the user network node, wherein the payment transfer parameters are triggered by the central, P2P transmission system as predefined authorization-parameters. Alternatively or additionally, the first cryptographic key can be transmitted to or made accessible to the user network node upon triggering allowance parameters of the user network node to access the individual, user-specific data by the data consumer network node. This embodiment variant has, inter alia, the advantage, that they provide an automated technical solution, whereby the end-user can monetize the intangible asset represented by the raw data. Furthermore, it creates a solution, where the end-user can safely share personal data with a data consumer network node, or respectively agent, to in exchange receive customized services. It allows the end-user to be sure that the data consumer agent will not misuse the data that is shared. Finally, it makes it possible, that a data consumer can trust the raw data produced by end-user in order to safely avoid (in)voluntary manipulation of them.

In another embodiment, the non-storage-based processing unit is open source and/or is realized as an open platform, so as to be accessible by any end-user and any user network node, wherein non-storage of the individual, user-specific data is controllable by the user throughout the data processing and provision of service by means of the non-storage-based processing unit. Furthermore, the non-storage-based processing unit can be realized as a flow in-flow out data system, where no storage or copy of the individual, user-specific data is performed by the non-storage-based processing unit. This embodiment has, inter alia, the advantage that the end-user, at any time, can ensure themselves, that the personal data shared is not misused by means of the data consumer network node in the context of provision of the requested data services to the user network node. In particular, it has to be mentioned, that, due to its technical structure and setting, the non-storage-based processing unit can easily be assigned to an independent third party, i.e. independent from the user network node or respective user and/or the data consumer network node or the respective provider or system operator, and thus can be operated completely independent from the user and/or the data consumer network node respectively the party assigned to the data consumer network node or the party owning the data consumer network node. This has the advantage, that many, mostly concerns of the public can be met related to the integrity and independence of the service provided by the non-storage-based processing unit respectively the respective service provider.

In a further embodiment, a billing module accesses the central, P2P transmission system by means of a billing gateway interface, first service detail records of the data consumer network node being transmitted from the central, P2P transmission system to the billing module, and the billing gateway interface comprising an assigned billing management database with first access and billing control data of each data consumer network node based on the service(s) of the specific data consumer network node for the service response data. The first access detail records can for example be generated by means of the billing module upon provision of a data-processing service by means of the first authentication database. Furthermore, by means of the billing gateway interface, the billing module can for example access the central, P2P transmission system, second access detail records of the data consumer network node being transmitted from the central, P2P transmission system to the billing module, and the billing management database comprising second service control data of each data consumer network node based on the data-processing services of the data consumer network node to the user network node. The second access detail records can for example be generated by means of the billing module by means of the second authentication database upon provision of the data-processing service.

In an even further embodiment, the encryption of the service response data by means of the first-tier cryptographic key and the encryption of the service response data with the second-tier cryptographic key can for example using a single type of encryption, wherein the secure key management system provides the encrypted content to the user network node associated with the first-tier cryptographic key and the second-tier cryptographic key. The first-tier cryptographic key and the second-tier cryptographic key can also be encrypted, based upon the hardware fingerprint of the user network node and a private key stored at the user network node. Furthermore, a first data stream including the encrypted individual, user-specific data and/or the service response data can for example be generated by the secure key management system, together with a locator for the encrypted data content. A second data stream then includes the corresponding cryptographic key and the locator of the content which is generated by the secure key management system. A third data stream may then include encrypted additional service response data provided by other data services, where the encrypted second data content can for example be generated by the secure key management system and a locator for the encrypted first data content. A forth data stream can then include the further cryptographic keys and locators of the content, which is generated by the secure key management system. Finally, the private key stored for the user network node can for example be in an encrypted format wherein the user network node decrypts the encrypted private key at the user network node using a key derived from a hardware fingerprint of the user network node. The user network node can for example decrypt the encrypted first cryptographic key and/or second cryptographic key using the decrypted stored private key.

In addition to the system, as described above, and the corresponding method, the present invention also relates to a computer program product that includes computer program code means for controlling one or more processors of the control system such that the control system performs the proposed method; and it relates, in particular, to a computer program product that includes a computer-readable medium that contains the computer program code means for the processors.

BRIEF DESCRIPTION OF THE DRAWINGS

Embodiments of the present invention are described below with reference to examples. The examples of the embodiments are illustrated by the following appended figures:

FIG. 1A shows a block diagram which schematically illustrates an exemplary embodiment of a secure key management, peer-to-peer (P2P) data transmission system 6 based on a double-tier cryptographic keys structure 2 providing a closed cryptosystem for secure content distribution within a secured network environment.

FIG. 2 shows schematically an exemplary secure key management, peer-to-peer transmission system 6 to protect individual, user-specific data 331. The end-user 31 produces the individual, user-specific data 331. End-user 31 needs and requests a service from Data Consumer DC respectively the data consumer network node 4. End-user 31 wants to ensure that DC does not copy his data 331. End-user's 31 individual, user-specific data 331 are stored in the P2P transaction platform 6. The transaction data are processed by the non-storage-based processing unit serving as a brokering platform. The non-storage-based processing unit is open source and/or realized as an open platform; the back end is accessible to any user. This is to assure the end-users 31 that no storage happens in the non-storage-based processing unit. The non-storage-based processing unit is thus realized as a flow In→flow out platform, and no storage or copying is performed. The services or data-processing services developed by DC are hosted in the non-storage-based processing unit. The DC's services are proprietary and not accessible to protect the respective IP. The non-storage-based processing unit encrypts service output with a DC key, i.e. the first cryptographic key 21 of the double-tier cryptographic keys structure 2, and returns the package to end-user 31. The end-user 31 encrypts the package with a user key, i.e. the second cryptographic key 22 of the double-tier cryptographic keys structure 2, and stores the encrypted package (e.g., double encrypted service response data 221 in the P2P transaction platform 6. Service response data 211 is property of the end-user 31, but to be consumed, it requires the DC key 21. For example, pay per transactions might be used as DC remuneration. In this scheme, the end-user 31 is and stays the owner of all the data: the captured and/or measured and/or generated raw data or individual, user-specific data 331, output of all the services, i.e. the service response data 211 applied to the individual, user-specific data 331.

FIGS. 4 and 5 shows a block diagram schematically illustrating an exemplary shared economy system 1 realized with agents of the system 1 as market place and illustrates the access rights of the market place (FIG. 5). End-user 31 access rights over the chain of data (from raw data 331 to claims and personal information data) are exposed in a stock exchange platform accessible only to the members of the shared economy system 6. The market place is regulated by a virtual currency VC. Each transaction over the market place happens via VC. In the ignition phase (~1 year from the launch) the end-user 31 decides the price in VC of each access right for which he is willing to share with the community. The market will regulate the price as in whatever stock exchange system (Adams law). The user must pay a royalty for services received from the transaction platform (TP). The royalty might be regulated by the market like the access rights. The consortium might decide to eliminate royalties.

DETAILED DESCRIPTION OF THE PREFERRED EMBODIMENTS

Figure 1B:
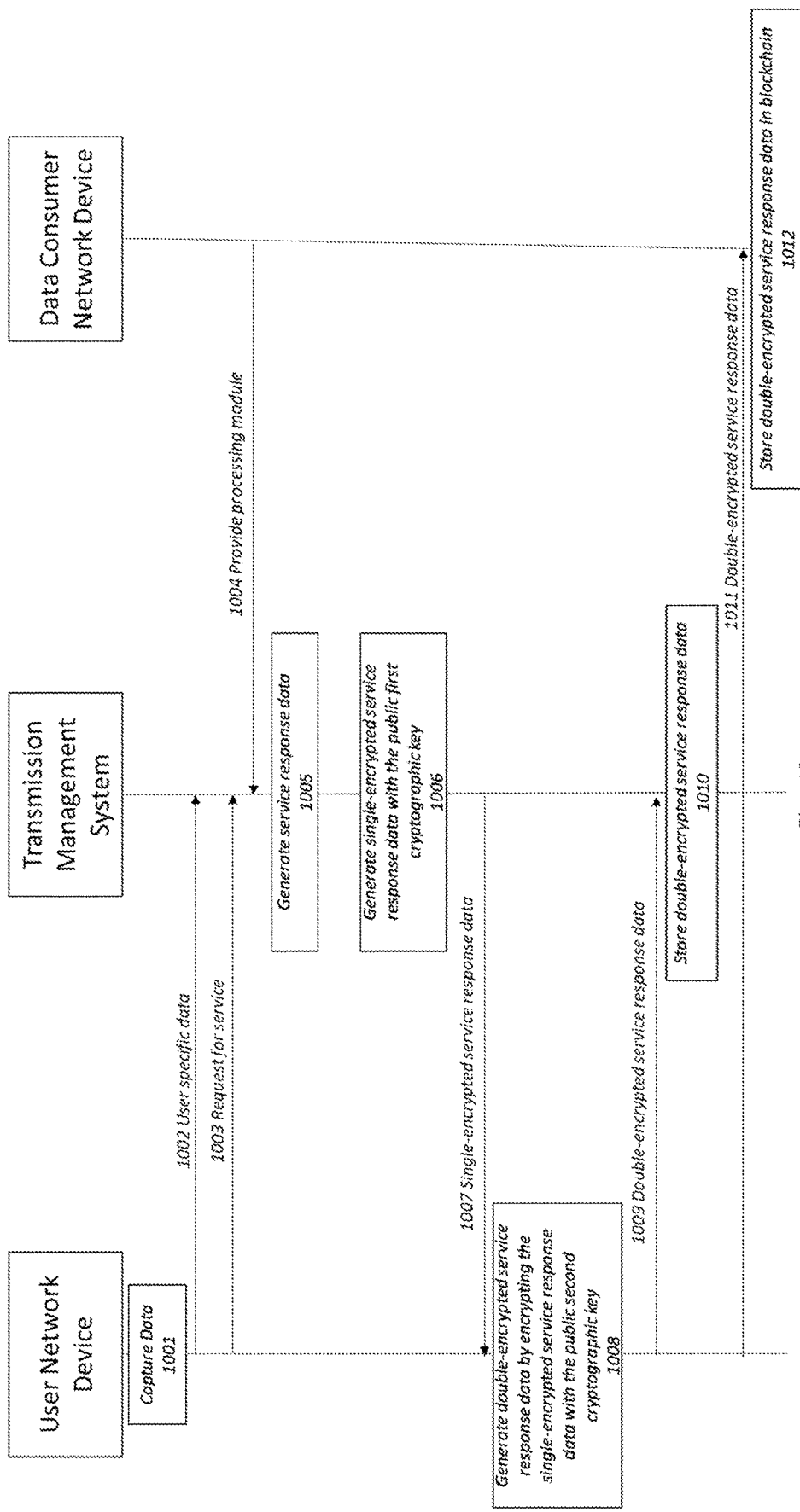
FIG. 1B illustrates a process corresponding to the functions occurring in the secure key management, peer-to-peer (P2P) data transmission system 6. Individual, user-specific data 331 are measured and/or captured and/or generated by means of at least one capturing device 33 associated with a user network node 3, and wherein based on the individual, user-specific data 331 services are requested from and provided to the user network node 3 by means of a data consumer network node 4. A first cryptographic key 21 is generated by the non-storage-based processing unit, wherein service response data 211 of a requested service are encrypted by means of the first cryptographic key 21 to single encrypted service response data 212 and transmitted to the user network node 3 in response to the requested service. The received single encrypted service response data 212 are encrypted by means of a generated second cryptographic key 22 to double encrypted service response data 221 by the user network node 3 and transmitted back and stored in the central, P2P transmission system 1 by the user network node 3. The first cryptographic key 21 is transmitted and/or made accessible to the user network node 3, if predefined authorization-parameters are triggered by means of the central, P2P transmission system 1.

FIG. 1A schematically illustrates an architecture for a possible implementation of an embodiment of the secure key management, peer-to-peer transmission system 6 providing a closed cryptosystem for secure content distribution within a secured network environment based on a controlled, double-tier encrypting cryptographic key structure 2. FIG. 1B illustrates a process in the system 6 as described below. Individual, user-specific data 331 are measured and/or captured and/or generated by means of at least one capturing device 33 associated with a user network node 3 (also referred to as a "user network device", see step 1001 in FIG. 1B), and, based on the individual, user-specific data 331 services are requested from and provided to the user network node 3 by means of a data consumer network node 4 (also referred to as a "data consumer network device"). The captured individual, user-specific data 331 are transmitted from the user network node 3 to a central, P2P transmission system 1 (also referred to as a "transmission management system", see step 1002 in FIG. 1B) via a data transmission network 5 and stored in the central, P2P transmission system 1, wherein the individual, user-specific data 331 are processed by means of a non-storage-based processing unit ((also referred to as a "processing module", see step 1004 in FIG. 1B) associated with the central, P2P transmission system 1 providing the service of the data consumer network node 4 requested by the user network node 3 (see step 1003 in FIG. 1B). The capturing device 33 and/or the user network node 3 can for example comprise a mobile phone, a web browser, telematics devices or a smartbox capturing health and/or wellness and/or home-related measuring parameters. Furthermore, the individual, user-specific data 331 can be or comprise telematics data 331 of a vehicle's trip measured and/or captured and/or generated by means of mobile telematics devices 33 associated with the user network node 3, wherein the telematics data 331 of the trip are stored as immutable transactions in the central, P2P transmission system, and wherein the telematics data 331 are encrypted with the second cryptographic key 22.

A first cryptographic key 21 is generated by the non-storage-based processing unit, wherein service response data 211 (generated at the transmission system, see step 1005 in FIG. 1B) of a requested service are encrypted by means of the first cryptographic key 21 to single encrypted service response data 212 (see step 1006 in FIG. 1B) and transmitted to the user network node 3 (see step 1007 in FIG. 1B) in response to the requested service. The received single encrypted service response data 212 are encrypted by means of a generated second cryptographic key 22 to generate double encrypted service response data 221 by the user network node (3) (see step 1008 in FIG. 1B) and transmitted back and stored in the central, P2P transmission system 1 by the user network node 3 (see steps 1009 and 1010 in FIG. 1B). The first cryptographic key 21 is transmitted and/or made accessible to the user network node 3, if predefined authorization-parameters are triggered by means of the central, P2P transmission system 1. By way of example, the transmission can be effected via said network 5. The communication network 5 can comprise a GSM or UMTS network, for example, or a satellite-based mobile radio network and/or one or more landline networks, for example the public switched telephone network, the worldwide Internet or suitable LAN (Local Area Network) or WAN (Wide Area Network). In particular, it also comprises ISDN and XDSL connections. The secure key management system 1 comprises the necessary electronic circuits used to generate the appropriate data signal. Also, as described later, The data consumer network device also receives and stores the double encrypted service response data 221 in a processing chain (also referred to as a "blockchain", see steps 1011 and 1012 in FIG. 1B).

In one embodiment, the user network node 3 comprises payment transfer modules configured to receive and store payment transfer parameters associated with the transfer to or accessibility of the first cryptographic key 21 to the user network node 3, wherein the payment transfer parameters are triggered by the central, P2P transmission system 1 as predefined authorization-parameters. However, as a further variant, the first cryptographic key 21 can also be transmitted to or made accessible by the user network node 3 upon triggering allowance parameters of the user network node 3 to access the individual, user-specific data 331 by the data consumer network node 4. Also as variant, the non-storage-based processing unit can be realized as open source and/or realized as an open platform to be accessible by any end-user 31 and any user network node 3, wherein non-storage of the individual, user-specific data 331 is controllable by the user 31 throughout the data processing and service provision by means of the non-storage-based processing unit. The non-storage-based processing unit can thus be realized as a flow in-flow out data system, where no storage or copy of the individual, user-specific data 331 is performed by the non-storage-based processing unit. As discussed above, this has the further advantage, that, due to its technical structure and setting, the non-storage-based processing unit can easily be assigned to an independent third party operating the non-storage-based processing unit, i.e. independent from the user 31, the user network node 3 and the data consumer network node 4, and thus can be operated completely independent from the user 31, the user network node 3 and/or the data consumer network node 4 respectively the party assigned to the data consumer network node 4 or the party owning the data consumer network node 4. This has the advantage, that many concerns, which are mostly concerns of the public, can easily be met related to the integrity, independency, trust and confidentiality of the service provided by the non-storage-based processing unit respectively the respective service provider.

By means of a network interface 32, a user network node 3 can request access to the central, peer-to-peer (P2P) transmission system 1, wherein the access control module 12 enables access to the central, peer-to-peer (P2P) transmission system 1 upon authentication and/or authorization by means of the first authentication database 212. As a possible realization, the authentication and/or authorization by means of the first authentication database 212 can for example comprise receipt of a license number associated with the user network node 3, and retrieval of a hardware fingerprint associated with the user network node 3 based on the license number, the hardware fingerprint being a unique identifier associated with the supply network node 3, and determining that the data consumer network node 4 is registered with the central, peer-to-peer (P2P) transmission system 1 based on one or more of the hardware fingerprint and the license number. The central, peer-to-peer (P2P) transmission system 1 encrypts a first content 211 with the first cryptographic key 21 generating encrypted first content 212.

As an embodiment, the secure key management system 1 and/or the encryption/decryption-unit 13 comprises means for encrypted and access-controlled transmission of the double-tier cryptographic keys structure 2 and the associated data content 211/221 and/or the first and/or second data container 42/43, where the access-controlled transfer of the data can be decrypted by generating a data token in line with transmitted access request data and transmitting it to the data consumer network node 4 and/or user network node 3, the data token comprising data which comprise at least portions of an appropriate key for the controlled encrypted data transfer, or comprising an access permit for a key for decrypting the data signal transferred. This embodiment has, inter alia, the advantage that the apparatus allows a high security standard and a technically stable response in the exchange between the various components. By way of example, the data token may be encrypted and/or electronically signed. In particular, the encryption can be performed using public key cryptography, particularly SSL (Secure Sockets Layer) or HTTPS, for example. The single encrypted service response data 212 is decrypted by the network node 3 using the first-tier cryptographic key 21. A first data container 42 can be generated by the data consumer network node 4 based on the service response data 211 and transferred to the user network node 3, wherein the user network node 3 is assigned to the first-tier cryptographic key by means of the secure key management system 1. The assignment is accessible to the user network nodes 3 registered to the first authentication database 121. The user network node 3 transfers an acceptance-confirmation of the content of the first data container 32 by responding to the secure key management system 1 via a network interface 41.

As a possible realization, the encryption with the first-tier cryptographic key 21 and the encryption with the second-tier cryptographic key 22 can for example use a single type of encryption, wherein the secure key management system 1 provides the encrypted data or content to the user network node 3 associated with the first-tier cryptographic key 21 and the second-tier cryptographic key 21. The first-tier cryptographic key 21 and the second-tier cryptographic key 21 can be encrypted based on the hardware fingerprint of the user network node 3 and a private key stored at the network node 3. For this embodiment, a first data stream including the single encrypted service response data 212 can for example be generated by the secure key management system 1 and a locator for the single encrypted service response data 212, and a second data stream including the first cryptographic key 21 and the locator of the content can for example be generated by the secure key management system 1. Also a third data stream including the encrypted content 222 (e.g., including the double encrypted service response data 221) can for example be generated by the secure key management system 1 and a locator for the double encrypted service response data 221, and a third data stream including the second cryptographic key 21 and the locator of the content can for example be generated by the secure key management system 1. The private key stored on the user network node 3 can for example be in an encrypted format and the user network node 3 decrypts the encrypted private key at the non-storage-based processing unit using a key derived from the hardware fingerprint of the user network node 3, and the user network node 3 decrypts the encrypted first cryptographic key 21 and/or second cryptographic key 22 using the decrypted stored private key.

Figure 3:
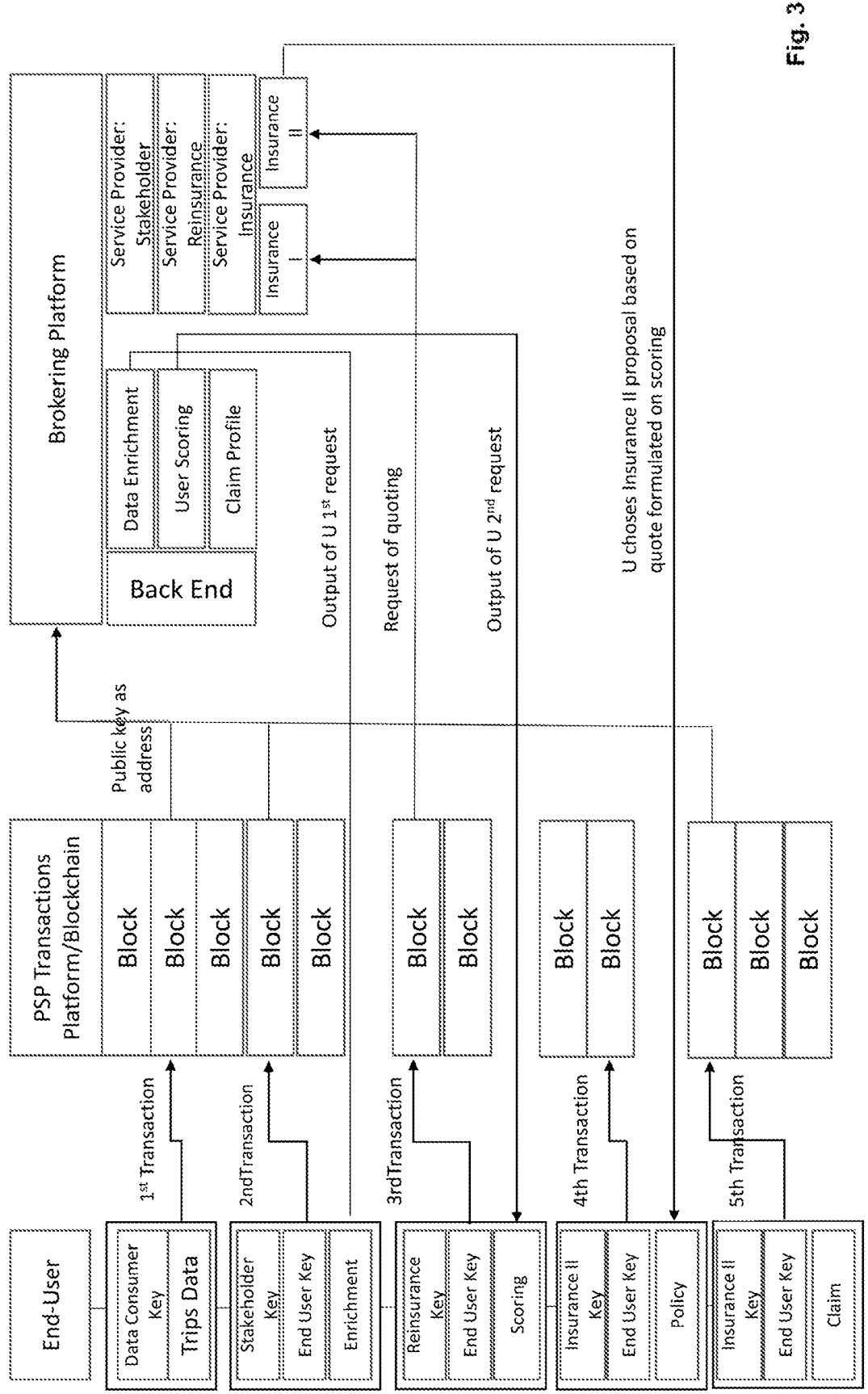
FIG. 3 shows schematically an exemplary of the secure key management, peer-to-peer transmission system 6 to protect individual, user-specific data 331 by an exemplary scheme of an automated telematics data management. The end-user 31 produces the raw data (trip data) as Individual, user-specific data 331 via telematics devices 33. The trip data 331 are stored as immutable transactions (1st transaction) in the P2P transaction platform 6. Data 331 are encrypted with user cryptographic key 21. The end-user 31 sends a request to the non-storage-based processing unit for an enrichment service over the trip data 331. The service is provided by a proprietary module developed by a service provider, i.e. a data consumer network node 4. Data are processed from the central, peer-to-peer (P2P) transmission system 1 via user public key 22 (as address) directly in the non-storage-based processing unit. The data consumer network node 4 stores the output 211 of the service in a chain of the end-user 31, encrypting it via user key 22 (second cryptographic key) and data consumer network node's 4 public key (2nd transaction), i.e. the first cryptographic key 21. The data of this transaction is owned by end-user 31 but encrypted by the end-user 31 key 22 and the data consumer's key 21. To access the data, both of the private keys are required. The end-user 31 requests an additional data-processing service, which is in this case a scoring service from the central, peer-to-peer (P2P) transmission system 1. To get the output, the end-user 31 must ask the data consumer network node 4 to decrypt the data (for example automatically in the back end of non-storage-based processing unit), this is represented in the (3rd transaction). A fee for the transaction might be charged to the end-user 31 by means of the payment transfer module 51 of the user network node 3. The end-user 31 receives the additional service from a second data consumer network node 4. Once more, the output is stored in the end-user's 31 chain and encrypted via public key 22 of the end-user 31 and of the public key 21 of the data consumer network node 4. Again, scoring like all the other services is a datum owned by the end-user 31. The end-user 31 requests a service of the central, peer-to-peer (P2P) transmission system 1, which is broadcast to all data consumer network nodes 4 able to cope with the request (in this case risk-transfer) providing a premium quote in return. The non-storage-based processing unit sends the quotes back to the user network node 3. The end-user 31 chooses or selects the preferred option (assume the one of a third data consumer network node 4) and stores the output, i.e. the service response data 211, (4th transaction) in the chain encrypting it with the public key 22 of end-user 31 and the public key 21 of the third data consumer network node 4. The 5th transaction occurs at the time in which the user network node 3 reports (or alternatively the device generating data detects) a crash. The same encryption is used as discussed above. All the transactions happen in the central, peer-to-peer (P2P) transmission system 1. All the data in the chain belongs to the end-user 31. The same for the output 211 of the services. Thus, services provided by a data consumer network node 4 to the user network node 3 will be encrypted with end-user's 31 key 22 and data consumer network node's 4 key 21.
Figure 4:
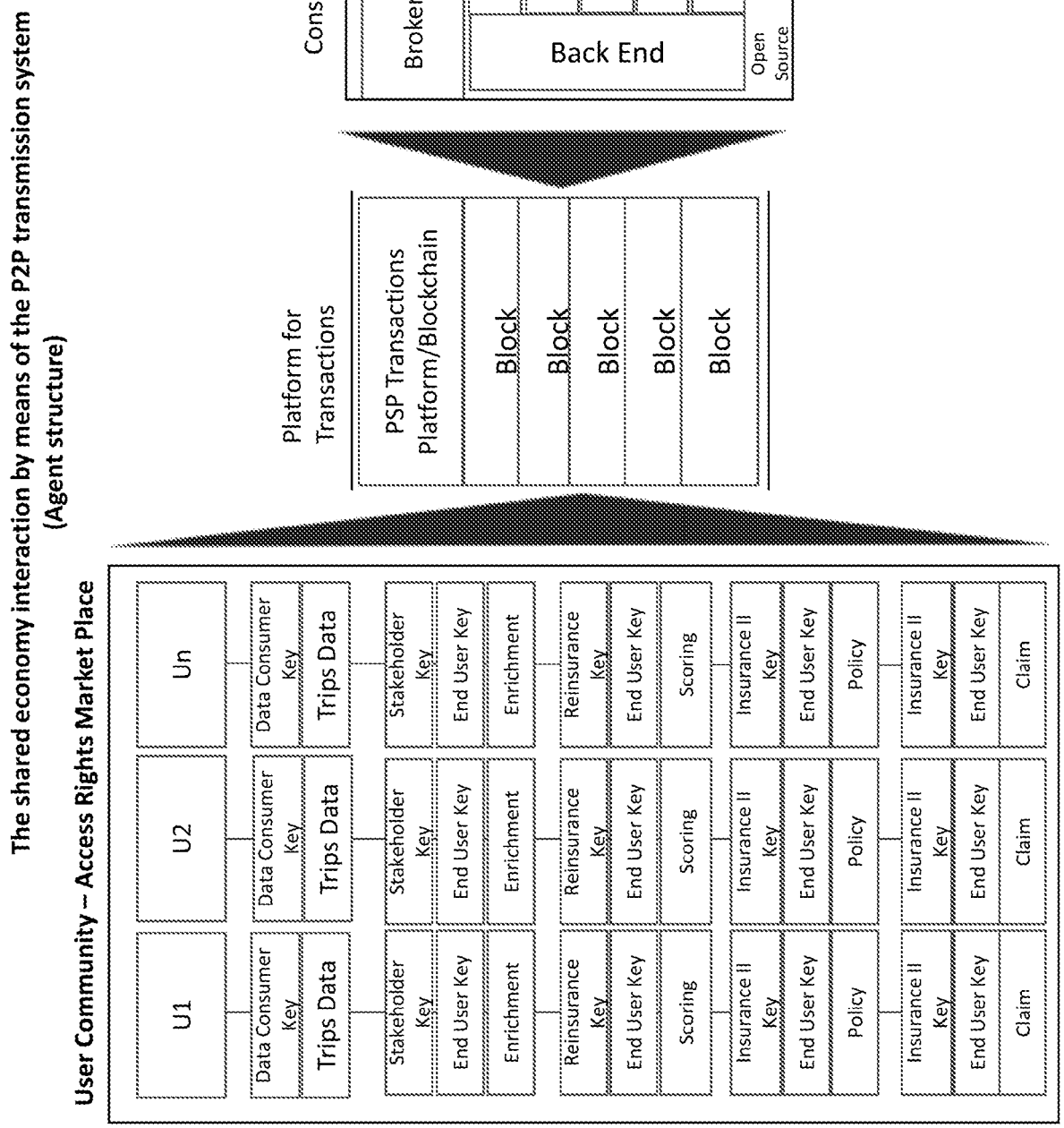
Figure 6:
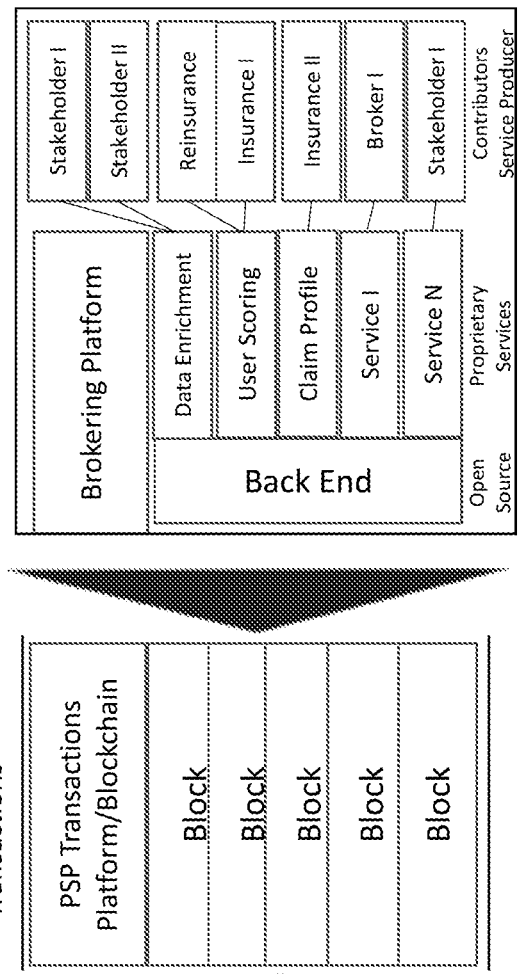
FIG. 6 shows another block diagram schematically illustrating an exemplary secure key management, peer-to-peer transmission system realized as data market place. A consortium may be constituted by reinsurance, insurance, broker, data providers, web search engines, health care companies and the like. There may be two different consortium members: (i) constitutive members, and (ii) partner members. The constitutive members contribute to the brokering platform 1 with modules in order to offer services to the other members of the shared economy system. The partner members have access to the market place 1 to buy access rights. A constitutive member can behave as end-user agent.

In an example of telematics data management realized by the automated system 1 (cf. FIG. 3), the individual, user-specific data 331 are processed by means of the non-storage-based processing unit based on a requested enrichment data service over the transmitted trip data by the user network node 3, wherein the non-storage-based processing unit providing the requested enrichment data service is realized as a proprietary module of a first data consumer network node 4. The transmitted telematics trip data are directly processed by the central, P2P transmission system 1 using a user public key as address. The first data consumer network node 4 stores the double encrypted service response data 221 in a processing chain assigned to the user encrypting it via the second cryptographic key 22 as user key and the first cryptographic key 21 as public key of the data consumer network node 4. To access the double encrypted service response data 221, both of the private keys 21/22 are required. The service response data 211 can be processed by means of the non-storage-based processing unit based on a second data service of a second data consumer network node 4 as scoring data service requested by the user network node 3. The non-storage-based processing unit providing the requested second data service requests the first data consumer network node (4) for decryption of the service response data 211 based on definable authorization-parameters. The triggered definable authorization-parameters can at least comprise payment transfer parameters. The enriched individual, user-specific data 331 are processed by means of the non-storage-based processing unit based on the requested second data service. The second data consumer network node 4 stores the double encrypted service response data 221 in the processing chain assigned to the user, encrypting it via the second cryptographic key 22, as user key and another first cryptographic key 21, as public key of the second data consumer network node 4. Again, to access the double encrypted service response data 221, both of the private keys are required. The scored double encrypted service response data 221 can, for example, be broadcasted to a plurality of data consumer network nodes 4, providing a risk-transfer profiling with a risk-transfer premium quote as data-processing services. The plurality of data consumer network nodes 4 store the premium quoting double encrypted service response data 221 in the processing chain assigned to the user encrypting it via the second cryptographic key 22, as user key and first cryptographic keys 21, of the data consumer network nodes 4. To access the double encrypted service response data 221, both of the keys are required, wherein the end-user 31 is enabled to select a preferred risk-transfer profiling with a risk-transfer premium quote of a specific data consumer network node 4 of the plurality of data consumer network nodes 4.

By means of a billing gateway interface 153, a billing module 15 can, for example, access the non-storage-based processing unit, first access detail records of the data consumer network node 4 being transmitted from the data consumer network node 4 to the billing module 15. The billing gateway interface 153 comprises an assigned billing management database with first access and billing control data of each data consumer network node 4 based on the access of the data consumer network node 4 to the first-tier cryptographic key 21 and/or single encrypted service response data 212. The first access detail records can, for example, be generated by means of the billing module 15 upon provision of the service by means of the first authentication database 121. By means of the billing gateway interface 153, the billing module 15 can access the non-storage-based processing unit. Second access detail records of the data consumer network node 4 are transmitted from the non-storage-based processing unit to the billing module 15, and the billing management database, comprising second access control data of each data consumer network node 4 based on the access of the data consumer network node 4 to the second-tier cryptographic key 22 and/or encrypted content 222. The second access detail records can, for example, also be generated by means of the billing module 15 and by means of the second authentication database 122 upon provision of the data-processing services to the user network node 3. The billing module 15 can, for example, bill the access to the first-tier cryptographic key 21 and/or the second-tier cryptographic key 22 obtained by the data consumer network node 4. The billing can, for example, be provided by transmitting appropriately generated TAP files to a billing service provider. As a variant, only the access to the second-tier cryptographic key 22 and/or encrypted content 222 is billed by means of the billing module 15, whereas the first-tier cryptographic key 21 is made publicly accessible within a first secured walled region without billing. This has, inter alia, the advantage that, in the case of risk transfer systems, the secure key management system 1 allows the use and billing of UW expertise to compile a risk assessment component for a provider, which in this case is the service for which a charge is made. The inventive system also allows for various revenue options, for example (i) dedicated license fees, (ii) per-use fees, for example, each time a supply network node 3, or for example, an automated insurance system, creates a quote using the first-tier cryptographic key 21 of the double-tier cryptographic keys structure 2, the data consumer network node 4 pays a fee, for example $1. This fee can be shared with a third party, or (iii) on a per sale basis, for example, each time a data consumer network node 4, or for example, an automated insurance system, makes a sale using the first-tier cryptographic key 21 of the double-tier cryptographic keys structure 2, the data consumer network node 4 pays or is billed a fee, for example, $29. This fee too can, for example, be shared with a third party. As an embodiment, the client management modules can, for example, intervene for control proposes, having the option to waive some or all of the fees in return for securing reinsurance treaties.

LIST OF REFERENCE SIGNS

1 Central, peer-to-peer (P2P) transmission system
12 Access control module
121 First authentication database
122 Second authentication database
13 Encryption/Decryption-Unit
14 Network interface
15 Billing module
153 Billing gateway interface
2 Double-tier cryptographic keys structure
21 First cryptographic key
211 Service response data
212 Single encrypted service response data
22 Second cryptographic key
221 Double encrypted service response data
222 Encrypted content
3 User network node
31 End-user
32 Network interface
33 Capturing device
331 Individual, user-specific data
4 Data consumer network node
41 Network interface 42 First data container
43 Second data container
5 Data-transmission network
6 Secure key management and data transmission system

The invention claimed is:

1. An electronic secure peer-to-peer transmission system based upon a controlled, double-tier encrypting cryptographic key structure providing a closed cryptosystem for secure digital data sharing and processing within a provided, secured digital network environment, comprising:
   a transmission management system;
   a data consumer network device;
   a user network device; and
   a data transmission network communicatively connecting the transmission management system, the data consumer network device, and the user network device, wherein
   the transmission management system comprises electronic circuits configured to:
      receive user-specific data from the user network device via the data transmission network;
      in response to a request for a service that is provided by the data consumer network device and requested by the user network device, process the user-specific data by a processing module that is provided by the data consumer network device to generate service respond data;
      generate single-encrypted service response data by encrypting, using a first cryptographic key associated with the data consumer network device, the service response data;
      transmit the single-encrypted service response data to the user network device; and
      receive double-encrypted service response data from the user network device and store the received double-encrypted service response data,
   the user network device comprises a processor that is configured to execute computer program codes to:
      obtain the user-specific data that is measured or captured by a capturing device associated with the user network device;
      transmit the user-specific data to the transmission management system;
      receive the single-encrypted service response data from the transmission management system in response to the request for the service that is provided by the data consumer network device and requested by the user network device;
      generate the double-encrypted service response data by encrypting, using a second cryptographic key associated with the user network device, the single-encrypted service response data; and
      transmit the double-encrypted service response data to the transmission management system,
   wherein the data consumer network device is configured to store each double-encrypted service response data in a processing chain as an immutable transaction of a blockchain assigned to a user of the user network device,
   the double-encrypted service response data is decryptable using private keys corresponding to both the second cryptographic key as a user key and the first cryptographic key as a public key of the data consumer network device, all the data in the chain being controlled by the user network device, and
   wherein the user network device or the transmission management system is configured to provide the first cryptographic key after the transmission management system receives predetermined authorization parameters associated with the user network device,
   wherein the first cryptographic key is made to be accessible to the user network device by the transmission management system in response to allowance parameters triggered by the data consumer network device, and
   wherein the processing module is accessible to the user network device, the user network device being configured to control non-storage of the user-specific data using the processing module.

2. The electronic secure peer-to-peer transmission system according to claim 1, wherein the user network device comprises a mobile phone, a web browser, one or more telematics devices, or an apparatus that is configured to generate the user-specific data by capturing health, wellness, or home-related measuring parameters.

3. The electronic secure peer-to-peer transmission system according to claim 1, wherein
   the processor of the user network device is configured to receive and store payment transfer parameters associated with accessibility of the first cryptographic key to the user network device, and
   the transmission management system is configured to control transmission of the first cryptographic key to the user network device based on the payment transfer parameters stored in the user network device.

4. The electronic secure peer-to-peer transmission system according to claim 1, wherein
   transmission of the single-encrypted service response data and the double-encrypted service response data is performed according to a public key cryptography.

5. The electronic secure peer-to-peer transmission system according to claim 1, wherein the transmission management system comprises the electronic circuits further configured to:
   encrypt the first cryptographic key according to a public key cryptography to obtained an encrypted first cryptographic key and provide the encrypted first cryptographic key to the user network device.

* * * * *